UNITED STATES PATENT OFFICE.

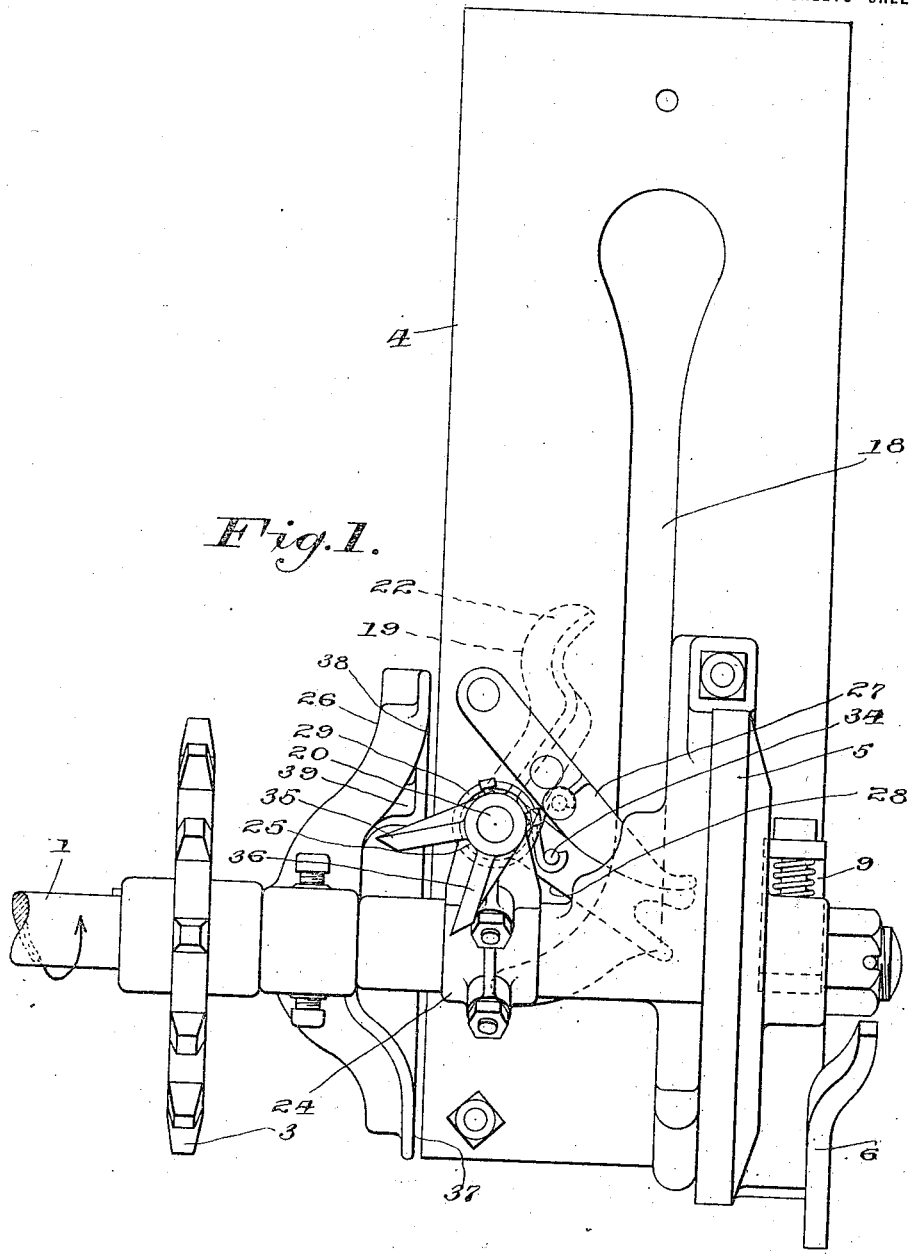

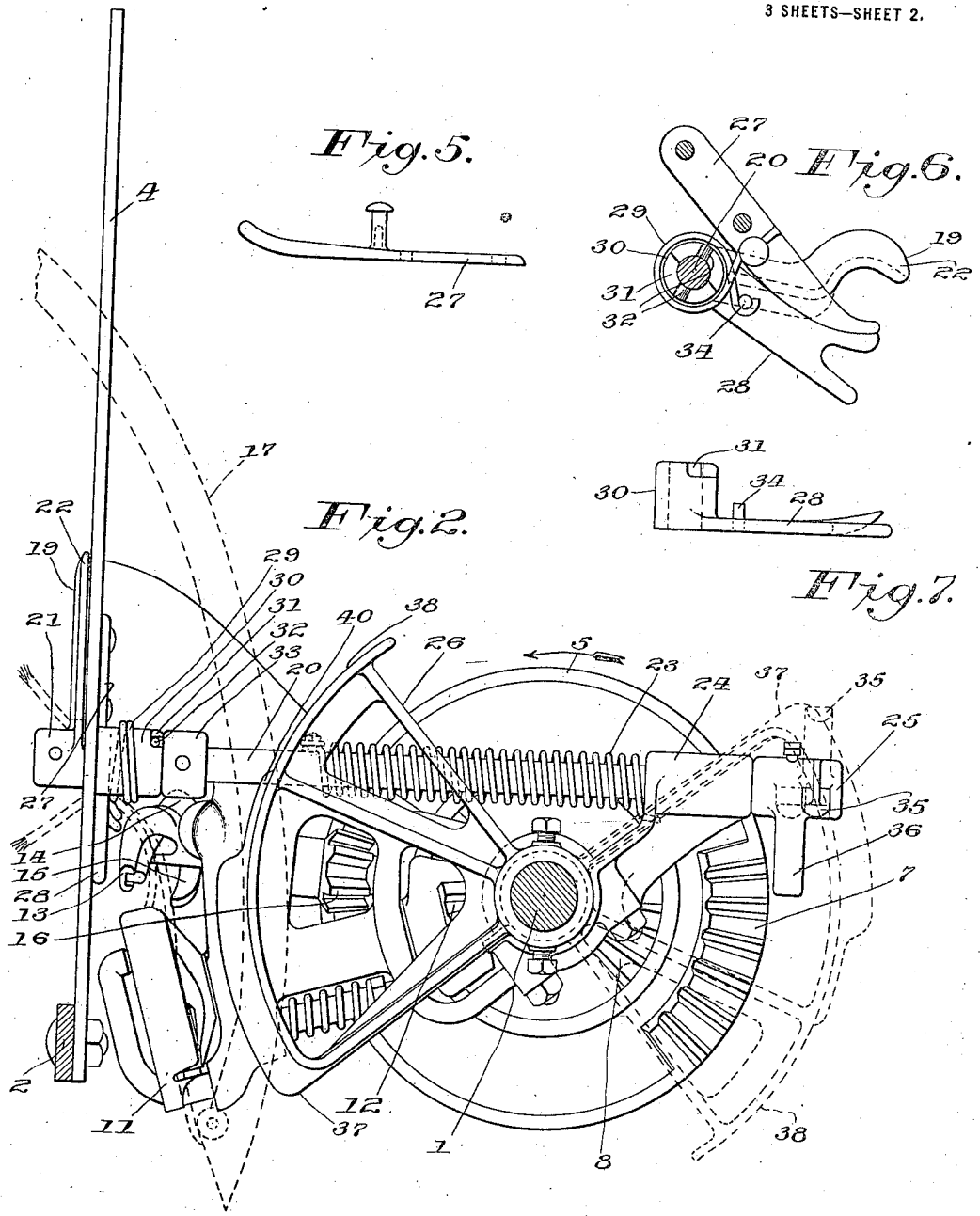

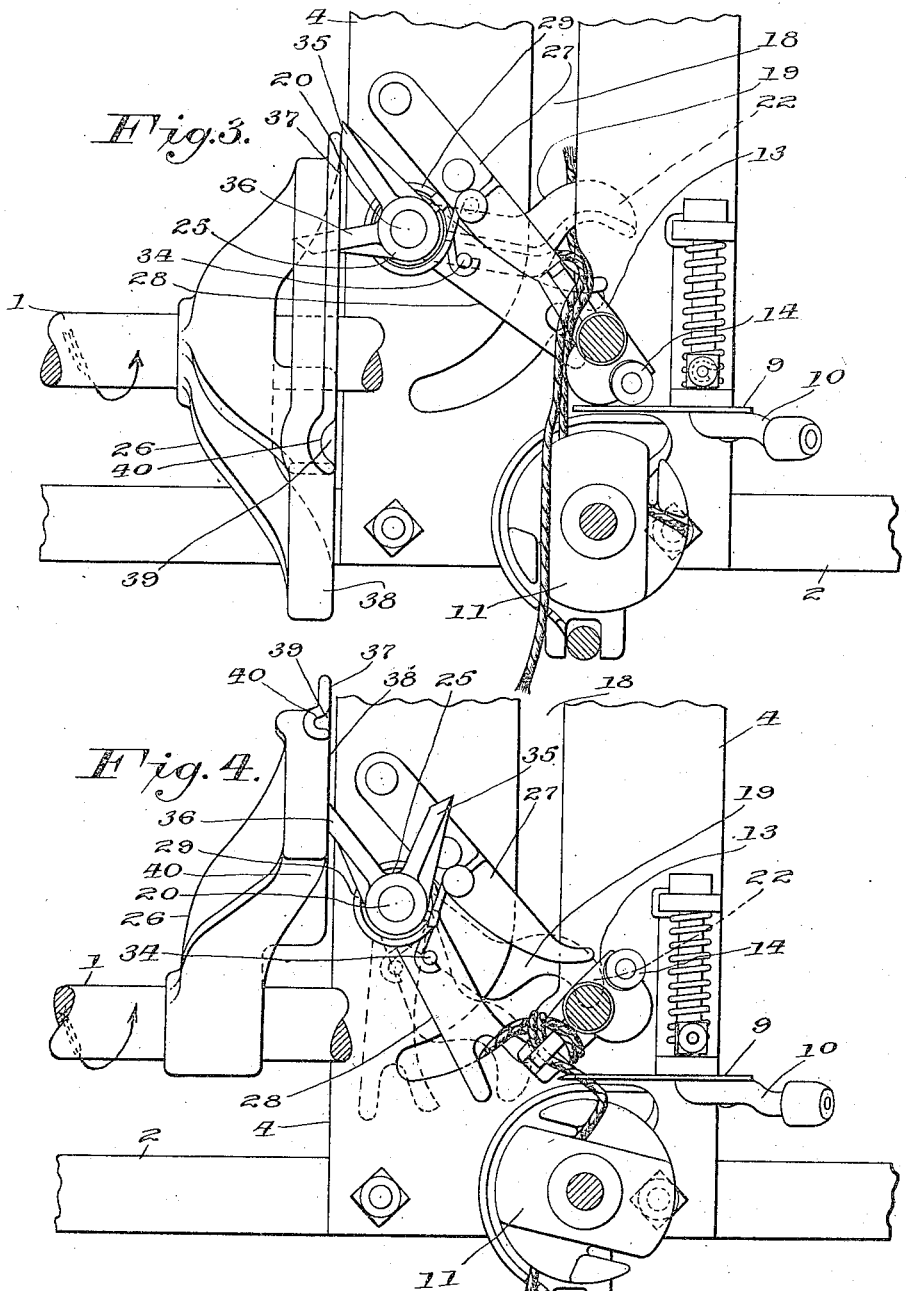

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

BINDING MECHANISM.

1,247,069.

Specification of Letters Patent.   Patented Nov. 20, 1917.

Application filed November 19, 1913.   Serial No. 801,881.

*To all whom it may concern:*

Be it known that I, BERT R. BENJAMIN, a citizen of the United States, residing at Oak Park, in the county of Cook and State of Illinois, have invented certain new and useful Improvements in Binding Mechanisms, of which the following is a full, clear, and exact specification.

My invention relates to binding mechanisms for grain binders, shockers and the like.

It has for its object to bind a bundle of grain in an improved manner. A further object of my invention is to tuck and strip the twine in an improved and economical manner whereby an increased radius of stripping movement is obtained and the twine is held at the desired tension throughout the entire operation. I attain these objects by providing an improved tucker and an improved stripper movable in an arc through an elongated path and coöperating with each other and with the knotting mechanism to tuck the twine, to take up the slack therein, and strip the same from a knotter hook, the latter coöperating therewith and being disposed in drooping position during the stripping operation.

In order that my invention may be clearly and fully disclosed, I have illustrated one embodiment of the same in the accompanying drawings. It is, of course, to be understood, however, that the construction shown herein is susceptible of modification and use in other relations.

Figure 1 is an end elevation of the mechanism.

Fig. 2 is a side elevation of the same showing the needle in dotted lines at the beginning of the binding operation.

Fig. 3 is an end view looking in the same direction as Fig. 1, showing the parts in the second stage of the knot tying operation.

Fig. 4 is a view similar to Fig. 3 showing the parts as the cord is being stripped off the knotter hook.

Figs. 5, 6 and 7 show details of portions of the operating mechanism.

The construction shown, when broadly considered, comprises a knotter used in combination with an improved tucker and an improved stripper, the several mechanisms coöperating in an improved manner hereinafter described.

The knotter mechanism shown is of the well known McCormick type and is mounted upon the knotter shaft 1 in a suitable frame 2. As in the usual construction, the knotter shaft is rotated through any suitable power connection 3 and is carried adjacent and parallel with a knotter breast plate 4. Upon the knotter shaft 1 the usual operating member 5 is carried, while this member in turn is provided with the usual knife operating cam 6 and the usual gear faces 7 and 8. As shown in Figs. 3 and 4, this knotter member is mounted adjacent the usual spring pressed knife mechanism 9 in such a manner that its cam 6 will engage with the handle 10 of the latter as the member 5 moves about with the shaft 1. This member 5 is further located above and at right angles to the usual cord holder 11 driven through a gearing connection 12 from the gear face 8; and, as in the usual construction, also drives a rotating knotter hook 13 having a roller 14 engaging the cam surface 15 to open the same, this hook being driven by a beveled gear connection 16 engaging the gear face 7 on the member 5 and being movable to the downwardly extending, inclined, or drooping stripping position shown in Fig. 4. As illustrated, this knotter mechanism is adapted to coöperate with a needle 17 moving through a curved slot 18 in the breast plate 4.

Coöperating with the knotter mechanism during the first stages of the knotting operation, is a tucker arm 19 which is carried upon the inner end of a shaft or spindle 20 disposed substantially at right angles to the knotter shaft 1 and having its inner end journaled in the breast plate 4. This tucker arm 19, as shown in Fig. 2, is preferably formed integral with a sleeve 21 fitting over the inner end of the shaft 20 in such a position that the tucker arm moving therewith moves in a plane parallel to the inner face of the knotter breast plate 4; a curved or hooked end 22 being provided thereon which is adapted to move across the slot in the breast plate and engage the twine in such a manner as to take up the slack therein or tuck the same prior to the operation of the knotter mechanism. This tucker arm is, however, normally raised out of the path of the twine by a coiled spring 23 encircling the shaft 20. Further, as shown in Fig. 1, the outer end of the shaft 20 carrying the same is journaled in a suitable bracket 24 supported by the knotter shaft or other suitable part carried by the frame, and a lugged bracket 25 is provided upon the end of the shaft 20 which is adapted to coöperate with a cam member 26 fixed to the knotter shaft, in such a manner as to time the downward movement and return of the tucker arm. Further, to coöperate with this tucker arm 19 an elongated twine finger 27 is provided which is rigidly attached to the frame on the inner surface of the breast plate 4 and provided with a curved free end which extends across the slot 18 in the breast plate.

Coöperating with this mechanism is a stripper arm 28 having a bifurcated free end. This stripper arm, as shown in Fig. 2, is carried upon the opposite side of the breast plate from the tucker arm 19 and is so disposed that it moves in a plane parallel thereto and beneath the free upturned end of the stationary twine finger 27. Further, as shown in Figs. 2, 3 and 4, it is resiliently connected to the tucker shaft 20 by a spring 29 and is provided with a collar or sleeve 30 independently rotatable upon the shaft 20 within the limits prescribed by a slot and pin connection 31, 32, this collar 30 being positioned between a collar 33 and the face of the breast plate in such a manner that the arm 28 may move from a point substantially beneath the twine finger 27 to a point at the end of the curve in the slot 18 and then be returned to its initial position shown in Fig. 1 by the spring 29, one of the ends of the latter being connected to the twine finger 27, while the other is slipped over a hook or stud 34 on the stripper 28.

Both this stripper and the tucker are operated by the cam member 26; the lugged bracket 25 upon the end of the shaft 20 being provided with a plurality of lugs 35 and 36 which engage different active faces 37 and 38 of the cam 26. As shown in Fig. 3, the lug 35 is adapted to engage the cam surface 37 to hold the tucker in the position shown therein and the cam is so constructed that as the lug 35 passes off of the cam surface 37, the lower lug 36 is picked up by a third slanting cam surface 39 in such a manner as to throw the shaft 20 slowly about its pivot, and raise the lug 36 to the position shown in Fig. 4, the tucker 19 and the stripper 28 moving slowly downward against the tension of the springs, and the lug 36 passing out upon the surface 38 through a recess 40 provided in the side of the cam member. Obviously, when the cam member 26 is rotated so that the lug 36 passes off the surface 38, the springs will return both the tucker and the stripper to their initial position.

In order that the operation of the assembled mechanism may be clear and the coöperation of the several devices therein will be more clearly apparent, I will describe the operation as follows: Let us assume that the needle 17 is moving toward the position shown in Fig. 2, in other words, that it is moving toward the knot tying position. At this time the parts are in the position shown in Fig. 2. The cord holder 11 is in position to receive the cord. The knotter hook 13 is closed and positioned in such a manner that the cord will pass over the same. The knife 9 is back. The tucker arm 19 is up and the twine finger 27 and stripper arm 28 are protruded across the slot 18 in the position shown in Fig. 1. As the needle 17 moves downward, the knotter shaft 1 is rotated and the cord holder 11 is rotated through its operating mechanism 12 from the position shown in Fig. 1 to the position shown in Fig. 3 in such a manner as to prevent the release of the twine. The knotter shaft 1 in its rotation further sets in motion the cam member 26 which engages the lug 35, moving the tucker arm 19 downward to the position shown in Fig. 3 so that its curved face comes over the curved end of the twine finger 27. It is further to be noted that during this movement there is no movement of the stripper arm 28, the latter by reason of the slot and pin connection 31, 32 occupying the same position under the twine holder until the knotter hook 13 has been turned through its driving mechanism 16 to open its jaws and grasp the twine with the usual turning or twisting movement to form the knot, when, due to the engagement of the lug 36 with the surface of the cam 38, the stripper arm 28 moves downward straddling the twine with its bifurcated end and pulling the knot off of the then drooping knotter hook as the latter reaches the end of its turning movement. (Fig. 4.) At substantially the same time the knife 9 is brought into operation through the action of the cam 6 and immediately the twine is severed and the parts returned to their initial position ready for the next operation when the needle 17 again passes through the slot 18; the stripper being returned by the spring 29 and stopping beneath the twine finger by reason of the slot and pin connection, and the tucker being thrown clear by the spring 23.

It is to be noted that in this construction I have combined the stripper and tucker mechanisms in such a manner that they are operated from the same actuating member and so coöperate as to give the proper tension and at the same time strip the knot from a drooping hook at the proper time and in an efficient manner, a materially increased length of stripping movement being obtained. It is further to be noted that the construction thus provided is adapted to cooperate with the knotter mechanism of a standard type binder without necessitating material change in the construction or involving great expense and that the new parts themselves are exceedingly simple and of a type which may be very cheaply manufactured.

While I have illustrated one embodiment of my invention in this application, it is, of course, to be understood that the form shown herein for purposes of illustration, may be modified without departing from the spirit of the invention.

What I claim as my invention and desire to secure by Letters Patent is:—

1. In a binding mechanism, a knotter shaft, knotter mechanism actuated thereby, a rock shaft movable in timed relation with said knotter mechanism, and independently movable tucker and stripper members operatively connected to said shaft.

2. In a binding mechanism, a knotter shaft, knotter mechanism actuated thereby, a supplemental cam carried thereon, a rock shaft actuated by said cam, and independently movable tucker and stripper members carried on said shaft coöperating with said knotter mechanism.

3. In a binding mechanism, a knotter shaft, knotter mechanism actuated thereby, a supplemental cam carried by said knotter shaft, a rock shaft actuated by said cam, a stripper carried on said shaft and coöperating with said knotter mechanism, and means whereby said shaft may have a limited independent movement.

4. In a binding mechanism, a knotter shaft, knotter mechanism actuated thereby, a rock shaft operatively connected to said knotter shaft, a stripper carried on said rock shaft and coöperating with said knotter mechanism, and a slot and pin connection between said rock shaft and said stripper.

5. In a binding mechanism, a knotter shaft, knotting mechanism actuated thereby, a second shaft disposed substantially at right angles to said knotter shaft, operative connections between said shafts, and a spring pressed stripper arm carried by said second shaft and coöperating with said knotter mechanism.

6. In a binding mechanism, knotter mechanism, a knotter breast plate, a rock shaft intermittently operable by said knotter mechanism, a stripper arm journaled on said rock shaft, and means for initially rocking said shaft independent of said stripper and subsequently moving said stripper therewith.

7. In a binding mechanism, knotter mechanism, a knotter breast plate, a rock shaft intermittently operable by said knotter mechanism, a stripper arm journaled on said rock shaft, means for initially rocking said shaft independently of said stripper and subsequently moving said stripper therewith, and a tucker fixed to said rock shaft.

8. In a binding mechanism, a knotter shaft, knotter mechanism actuated thereby, a second shaft actuated thereby, and tucker and stripper arms carried on said second shaft coöperating with said knotter mechanism to tuck and strip the twine, said tucker arm assisting said stripper arm in the stripping operation.

9. In a binding mechanism, a knotter shaft, knotter mechanism actuated thereby, and tucker and stripper arms actuated by said knotter shaft and coöperating with said knotter mechanism, one of said arms having a bifurcated end into which the twine is delivered by the other arm and both of said arms coöperating throughout the entire range of movement of one of the same.

10. In a binding mechanism, a knotter shaft, knotter mechanism actuated thereby, tucker and stripper arms actuated by said knotter shaft and coöperating with said knotter mechanism, one of said arms having a bifurcated end into which the twine is delivered by the other thereof and both of said arms coöperating throughout the entire range of movement of one of the same, and means for automatically returning said arms to their initial positions.

11. In a binding mechanism, a frame, a knotter shaft journaled therein, knotter mechanism actuated by said knotter shaft, a cam mounted on said shaft adjacent said knotter mechanism having a plurality of active surfaces, a tucker and stripper shaft journaled in said frame and actuated by said cam, and tucking and stripping mechanism carried on said shaft coöperating with said knotter mechanism in predetermined sequence.

12. In a binding mechanism, knotter mechanism having a hook movable into drooping position at the completion of the knotting operation, a rock shaft intermittently operable by said knotting mechanism, a tucker arm carried by said rock shaft, a stripper carried by said rock shaft, and means whereby said tucker is operated during the first stages of the knotting operation and said stripper during the last stages thereof.

13. In a binding mechanism, knotter mechanism having a hook movable into drooping position at the completion of the knotting operation, a rock shaft intermittently operable by said knotting mechanism, a tucker arm carried by said rock shaft, a stripper journaled on said rock shaft, and operative connections between said stripper and shaft whereby both the tucker and stripper move together to strip the twine from the drooping hook.

14. In a binding mechanism, a frame, a knotter shaft journaled thereon, a gear mounted on said shaft, a plurality of shafts driven from said gear, cord holding, knotting and cutting mechanism operatively connected to said shafts, a cam carried by said knotter shaft at one side of said gear, a supplemental shaft disposed substantially at right angles to said knotter shaft and actuated by said cam, and means carried by said supplemental shaft coöperating with the mechanism actuated by said gear to tuck and strip the twine.

15. In a binding mechanism, a frame, a knotter shaft carried thereon, a cam carried on said shaft, a shaft disposed substantially at right angles to said knotter shaft and journaled thereon, a breast plate in which the opposite end of said last mentioned shaft is journaled, a cam carried on said knotter shaft adjacent one end of said second shaft, a projection on the end of said second shaft engageable by said cam, and tucking and stripping means carried on the opposite end of said shaft coöperating with said knotter mechanism.

16. In a binding mechanism, a frame, a knotter shaft carried thereon, a slotted breast plate carried on said frame adjacent said shaft, a cam carried on said knotter shaft, knotter mechanism actuated by said knotter shaft located between said shaft and said breast plate, a second shaft extending substantially at right angles to said knotter shaft and supported by said breast plate and frame, operative connections between said shaft and said cam, and means carried by said second shaft coöperating with said knotter mechanism to tuck and strip the twine.

17. In a binding mechanism, a frame, a breast plate carried thereon having a longitudinally extending slot therein curved at its bottom, knotter mechanism supported by said frame at a point adjacent the curved end of said slot, a cam movable with said knotter mechanism, and means actuated thereby and operating on opposite sides of said breast plate and at different points in the end of said slot to coöperate with said knotter mechanism and successively tuck and strip the twine.

18. In a binding mechanism, a frame, a knotter shaft, a breast plate having a slot therein, knotter mechanism carried by said frame adjacent said breast plate, a tucker and stripper shaft journaled in said breast plate and operatively connected to said knotter shaft, a tucker arm movable with said shaft on the outer wall of said breast plate and across the slot in the same, a stripper arm likewise movable with said tucker arm across the end of said slot to coöperate with said knotter mechanism, and means for automatically returning said tucker and stripper arms to their initial positions.

19. In a binding mechanism, a frame, a knotter shaft supported thereby, a breast plate carried by said frame, a second shaft supported by said breast plate and said knotter shaft, a cam carried by said knotter shaft adjacent one end of said second shaft, said cam having a plurality of cam surfaces, a plurality of cam engaging members carried by said second shaft, tucker and stripper arms carried by said shaft coöperating with said knotter mechanism and actuated upon engagement of different cam engaging members by said cam, and means for automatically returning said tucker and stripper arms to their initial positions upon the completion of the knotting operation.

20. In a binding mechanism, a frame, a breast plate carried thereon having a slot in its lower end, a knotter shaft supported by said frame, knotter mechanism disposed between said breast plate and said knotter shaft and actuated by the latter, a cam rotatable with said knotter shaft, a second shaft journaled in said breast plate at one side of said slot and supported by said knotter shaft in a plane substantially at right angles thereto, a plurality of radially extending projections on one end of said second shaft successively engageable by said cam, a spring tending to return said shaft to its normal position after the passage of said cam, a tucker arm carried on the opposite end of said shaft movable across the slot in said breast plate during the first stages of the knotting operation, and a stripper arm carried on said shaft adjacent said tucker arm coöperating with said knotter mechanism at a subsequent stage in the knotting operation to strip the twine.

21. In a binding mechanism, a frame, a breast plate carried thereon having a slot therein, a knotter shaft journaled on said frame, knotter mechanism disposed between said breast plate and said knotter shaft and actuated by the latter, a cam rotatable with said knotter shaft, a second shaft journaled in said breast plate at one side of said slot and supported by said frame in a plane substantially at right angles to said knotter shaft, a plurality of radially extending projections on one end of said second shaft successively engageable by said cam, a spring tending to return said shaft to its normal position after the passage of said cam, a twine finger disposed across the lower end of the slot in said breast plate, a tucker arm carried on said rock shaft and movable across the slot in said breast plate during the first stages of the knotting operation, a stripper arm journaled on said rock shaft, means between said stripper and said shaft whereby the latter may move independently of the former during the first stages of its rocking movement and later rotate the stripper therewith, and resilient means operatively connected to said stripper normally
5. maintaining the same across the lower end of said slot at a point beneath said twine finger.

In testimony whereof I affix my signature, in the presence of two witnesses.

BERT R. BENJAMIN.

Witnesses:
  RAY D. LEE,
  FRANK A. ZABILKA.

Copies of this patent may be obtained for five cents each, by addressing the "Commissioner of Patents, Washington, D. C."